United States Patent [19]

Norling et al.

[11] Patent Number: 4,533,914
[45] Date of Patent: Aug. 6, 1985

[54] REMOTELY CONTROLLED CROSSCONNECTION SYSTEM

[75] Inventors: Thomas B. Norling, Piscataway; Joseph H. Polkowski, Lakewood; Jeffrey A. Poulsen, Fords; Daniel E. Robinson, Metuchen, all of N.J.

[73] Assignee: GK Technologies, Incorporated, Greenwich, Conn.

[21] Appl. No.: 440,247

[22] Filed: Nov. 8, 1982

[51] Int. Cl.³ .......................... H04Q 3/26; H04M 3/00
[52] U.S. Cl. .......................... 340/825.79; 179/175.2 R; 340/825.74; 340/825.01; 340/825.56
[58] Field of Search .......................... 340/825.79, 825.74, 340/825.56, 825.01; 179/2 A, 175.2 R, 175.21, 175.25, 175.3 R, 18 GE, 175.3 S

[56] References Cited

U.S. PATENT DOCUMENTS

| | | | |
|---|---|---|---|
| 3,472,965 | 10/1969 | Blossom | 340/825.73 |
| 4,028,498 | 6/1977 | Mehaffey et al. | 179/18 GE |
| 4,035,773 | 7/1977 | Kohout et al. | 340/825.79 |
| 4,076,970 | 2/1978 | Lubarsky, Jr. et al. | 179/175.2 R |
| 4,258,236 | 3/1981 | Conklin et al. | 179/175.3 R |
| 4,314,110 | 2/1982 | Breidenstein et al. | 179/175.2 R |

*Primary Examiner*—Donald J. Yusko
*Attorney, Agent, or Firm*—Hopgood, Calimafde, Kalil, Blaustein & Judlowe

[57] ABSTRACT

A DTMF encoder at a central office is connected to a spare pair of a feeder cable for remotely controlling with a 5-digit number a series of relay coil matrices where the coils perform latch and release functions for 50 latching relays in each matrix. Two of the digits select the matrix and two other digits select the relay coil to be energized. The fifth digit selects the crossconnect box or pedestal from a plurality of the same. The 50 relays are connected in pairs to serve 25 incoming pairs, each pair of relays being arranged to selectively connect its associated incoming pair to any one of three corresponding outgoing pairs or terminals. Energizing current is supplied to a selected coil only upon receipt of the last of the five digits and only for a brief interval. Power for the remote apparatus is supplied from the central office via a phantom circuit over the same spare pair.

15 Claims, 6 Drawing Figures

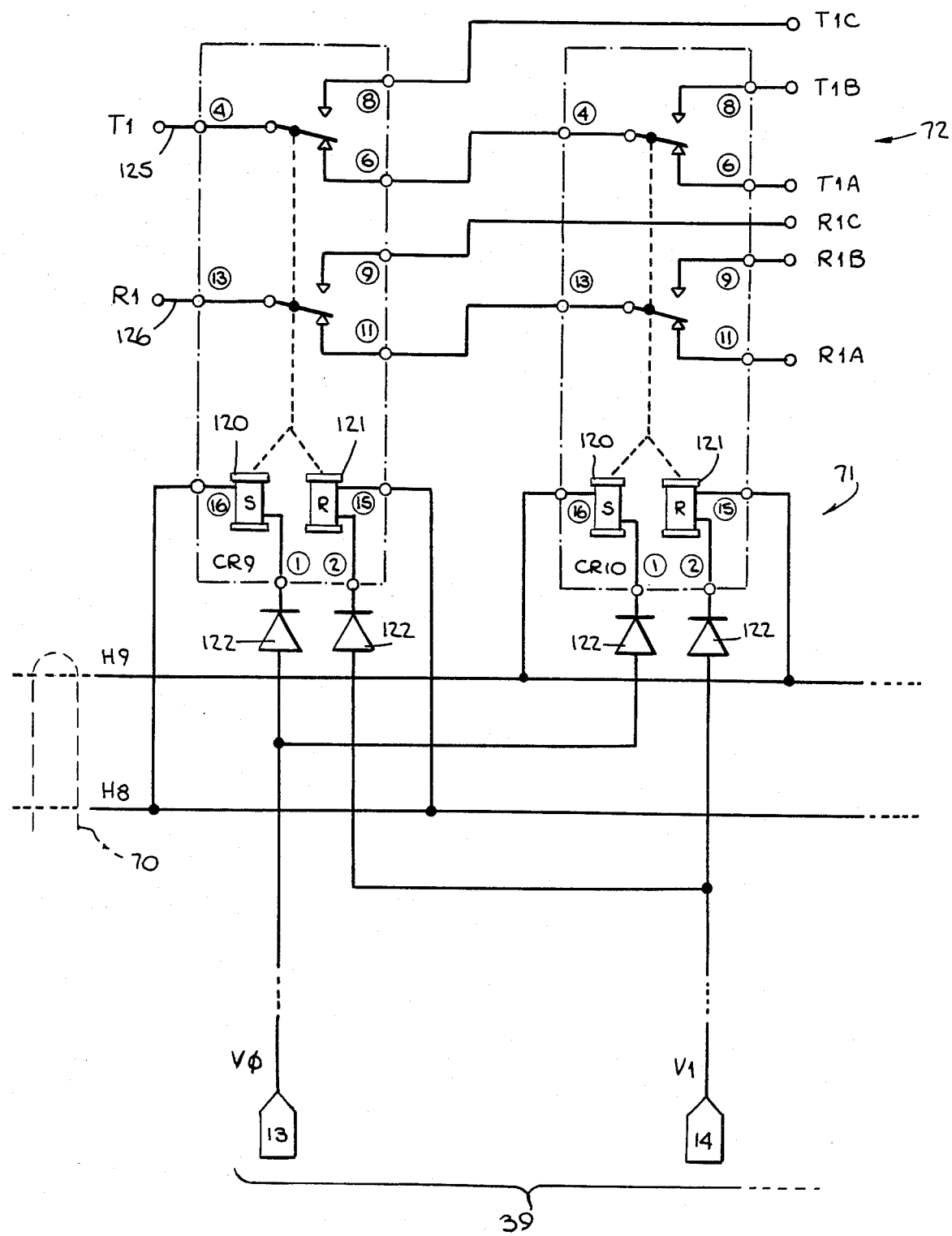

REMOTELY CONTROLLED CROSSCONNECTION SYSTEM

BACKGROUND OF THE INVENTION

The present invention relates to circuit switching and particularly to remotely controlled switching.

Present practice in the telephone industry for handling trunk and local line installations is to install multi-pair feeder cables from central offices to crossconnect boxes and pedestals from which local pairs fan out to the various customers. A crossconnect box accommodates a large number of twisted pairs utilized in a 2:1 ratio, i.e., twice as many pairs for local or distribution service as are used for feeder service. A typical box can have 600 feeder pairs and 1200 distribution pairs for a total of 1800 pairs. Pedestals typically contain provision for a lesser number of pairs, e.g., 75 pairs consisting of 25 input and 50 output pairs.

Although twice as many distribution or output pairs are provided, only half are used at any one time and it is necessary to effect crossconnection between the utilized output pairs and the respective input pairs. Currently, crossconnection is effected manually by installing jumper wires. Whether this is accomplished with quick-connect terminals or with screw terminals, the initial installation is time consuming and must be accomplished by a highly trained installer. When changes or repairs are required, a repairman must be dispatched and an average service call is likely to involve a matter of hours. Moreover, when service personnel change or repair jumper connections, there is not always close adherence to recommended practice and connections are made which eventually reduce the crossconnect box to a jumble of wires, occasionally reaching the point that complete rewiring is required.

Consequently, a considerable overhead is involved in both initial installation and in maintenance of manually operable crossconnection systems as presently used by the telephone companies. An alternative is greatly in demand and the present invention is directed toward providing same.

SUMMARY OF THE INVENTION

In accordance with the subject invention there is provided a remotely controlled crossconnection system for remotely selecting and switching a signal circuit selectably between a plurality of predetermined local circuits, said system comprising in combination a switching matrix having a plurality of selectable switching means each with one terminal coupled to a different signal circuit and with a plurality of additional terminals coupled respectively to a different one of said predetermined local circuits, a decoder device, means coupled between said decoder and one axis of said matrix for storing information corresponding to one digit of a plural digit encoded signal upon receipt of said one digit in a predetermined digit sequence, and means for applying a control to another axis of said matrix upon receipt of a signal corresponding to a subsequent digit of said plural digit encoded signal, said last mentioned means including means for simultaneously using said stored information to apply a corresponding control to said one axis, the application of said controls to said axes serving to select and operate one of said switching means.

BRIEF DESCRIPTION OF THE DRAWINGS

The invention will be better understood after reading the following detailed description of the presently preferred embodiment thereof with reference to the appended drawings in which:

FIG. 6 is a schematic diagram showing how pairs of relays can be connected in tandem or cascade to increase the number of outlet pairs that can be connected to a given input pair.

The same reference numerals are used throughout the drawings to designate the same or similar parts.

DETAILED DESCRIPTION OF THE PREFERRED EMBODIMENT

Figure 1:
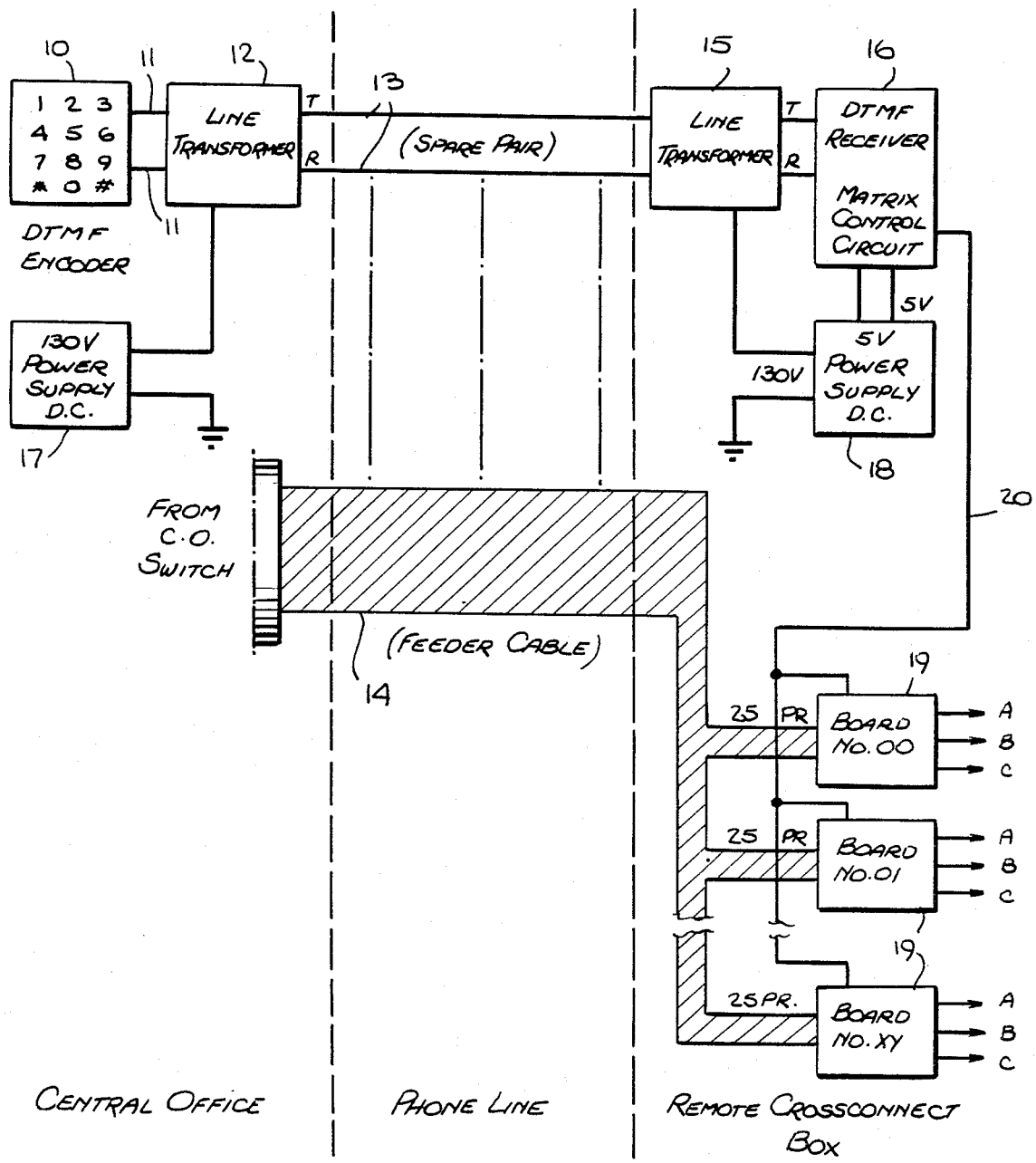
FIG. 1 is a block diagram of the overall system from central office to remote crossconnect box.

Referring to FIG. 1 there is shown in general terms the system embodying the present invention. Starting with the central office with the usual telephone equipment, not shown, there radiates outwardly phone lines in the form of feeder cables leading to remote crossconnect boxes. At the central office there is provided an encoder. A convenient device is the conventional DTMF (dual tone multi-frequency) encoder 10 which translates keyboard entries into electronic tone signals for transmission to the remote crossconnect box for establishing or changing connections. As shown, the encoder 10 is connected to a wire pair 11 feeding a line transformer 12 whose tip (T) and ring (R) output terminals are connected to a spare wire pair 13 carried by the feeder cable 14. The opposite end of the pair 13 at the remote crossconnect box couples into another line transformer 15 providing tip and ring signals to the DTMF Receiver - Matrix Control Circuit 16. Power for operating the circuit 16 is obtained over the same wire pair 13 by means of the connection at the central office of a DC high voltage supply 17 to transformer 12 and the connection at the remote crossconnect box of the voltage converter 18 to both the transformer 15 and the receiver - control circuit 16.

The matrix mentioned above is contained on each of the switching boards 19 of which there may be up to 100 controlled by a single receiver - control circuit 16. Each board 19 is fed by 25 wire pairs from the feeder cable 14 as well as by the switching controls furnished over cable 20 from the circuit 16. As shown in the drawing, the matrix boards 19 each have a two-digit address between 00 and 99. However, since a particular crossconnect box may not have the capacity for 100 switching boards we have designated one of the boards as "XY" representing the highest two-digit number actually used. Obviously, if there are fewer than 100 boards in a given crossconnect box or fewer than 100 boards controlled by a single receiver - control circuit 16, the two-digit address numbers may be selected arbitrarily within the range of 00 to 99 so long as there is no duplication. As shown symbolically in FIG. 1, each of the boards 19 can switch an incoming pair to any one of three outgoing distribution pairs labeled A, B, and C.

Figure 2:
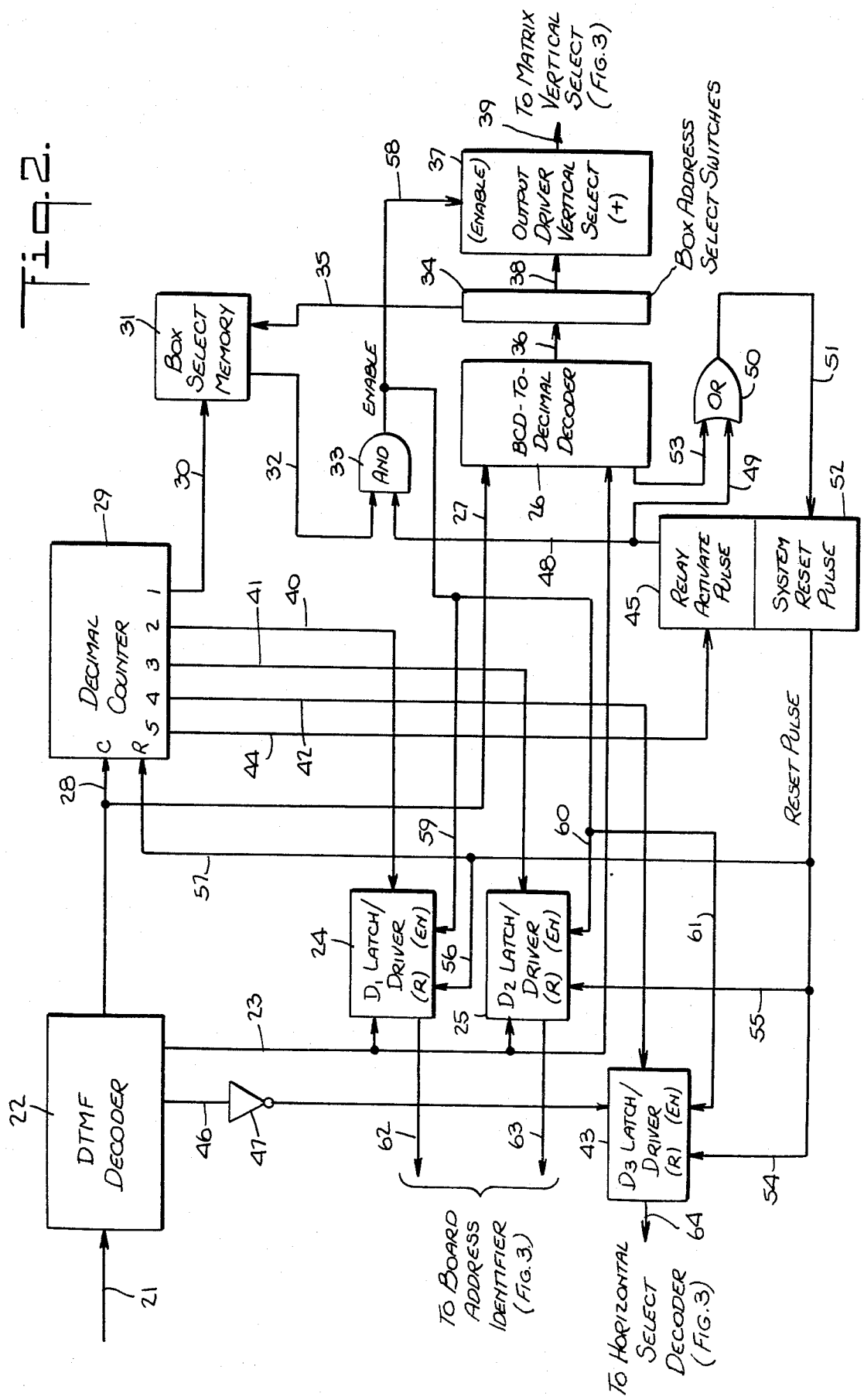
FIG. 2 is a block diagram of the DTMF Receiver - Matrix Control Circuit of FIG. 1.

Turning now to FIG. 2, there is a logic diagram of the system that constitutes the DTMF Receiver - Matrix Control Circuit 16 of FIG. 1. The incoming signal from the transformer 15 (FIG. 1) is fed over an input 21 to a DTMF Decoder 22. The decoder 22 furnishes an output over path 23 to two latch/driver units 24 and 25, designated, respectively, $D_1$ and $D_2$. The same output signal is also fed to a BCD-TO-DECIMAL DECODER 26. The decoder 26 is also furnished with a strobe signal over path 27 from a strobe output of the decoder 22. The same strobe output over a parallel path 28 is furnished to a counting input of a decimal counter 29 employed as a sequencing or commutating switch.

As shown in FIG. 2, the counter 29 has five outputs of which the first is connected over a path 30 to a box select memory device 31 which, in turn, has an output connected over path 32 to one input of an AND gate 33. An assembly 34 of a series of box address select switches has an output connected over a path 35 to a second input to the box select memory 31. In addition, an output from the decoder 26 is fed over path 36 through the box address select switch device 34 to the Output Driver Vertical Select assembly 37 by way of path 38. An output over path 39 is furnished by output driver 37 to the matrix vertical select input to be described below with reference to FIG. 3.

Signals are also fed from decimal counter 29, in sequence, over path 40 to the latch/driver 24, over path 41 to the latch/driver 25, over path 42 to a further latch/driver 43 (identified as $D_3$) and over path 44 to a relay activate pulse generator 45. The outputs from counter 29 over paths 40, 41 and 42 function as strobe controls for setting the latches 24, 25 and 43 in accordance with signals received from decoder 22. The latch 43 receives its signals from decoder 22 over a path 46 that includes an inverter 47.

The relay activate pulse generator 45 has an output that is fed over a path 48 to the second input of AND gate 33 and over path 49 to one input of an OR gate 50 whose output is connected over a path 51 to a system reset pulse circuit 52. The second input of OR gate 50 is connected over path 53 to an output of the decoder 26. The output from system reset pulse circuit 52 is connected over paths 54, 55, 56 and 57, respectively, to latch/driver 43, latch/driver 25, latch/driver 24, and decimal counter 29. Finally, AND gate 33 has its output connected over path 58 to an ENABLE input of output driver 37 and over paths 59, 60 and 61 to ENABLE inputs of latch/drivers 24, 25 and 43, respectively. The latch/drivers 24, 25 and 43 feed output paths 62, 63 and 64, respectively, leading to the board address identifier and horizontal select decoder circuits in FIG. 3.

Figure 3:
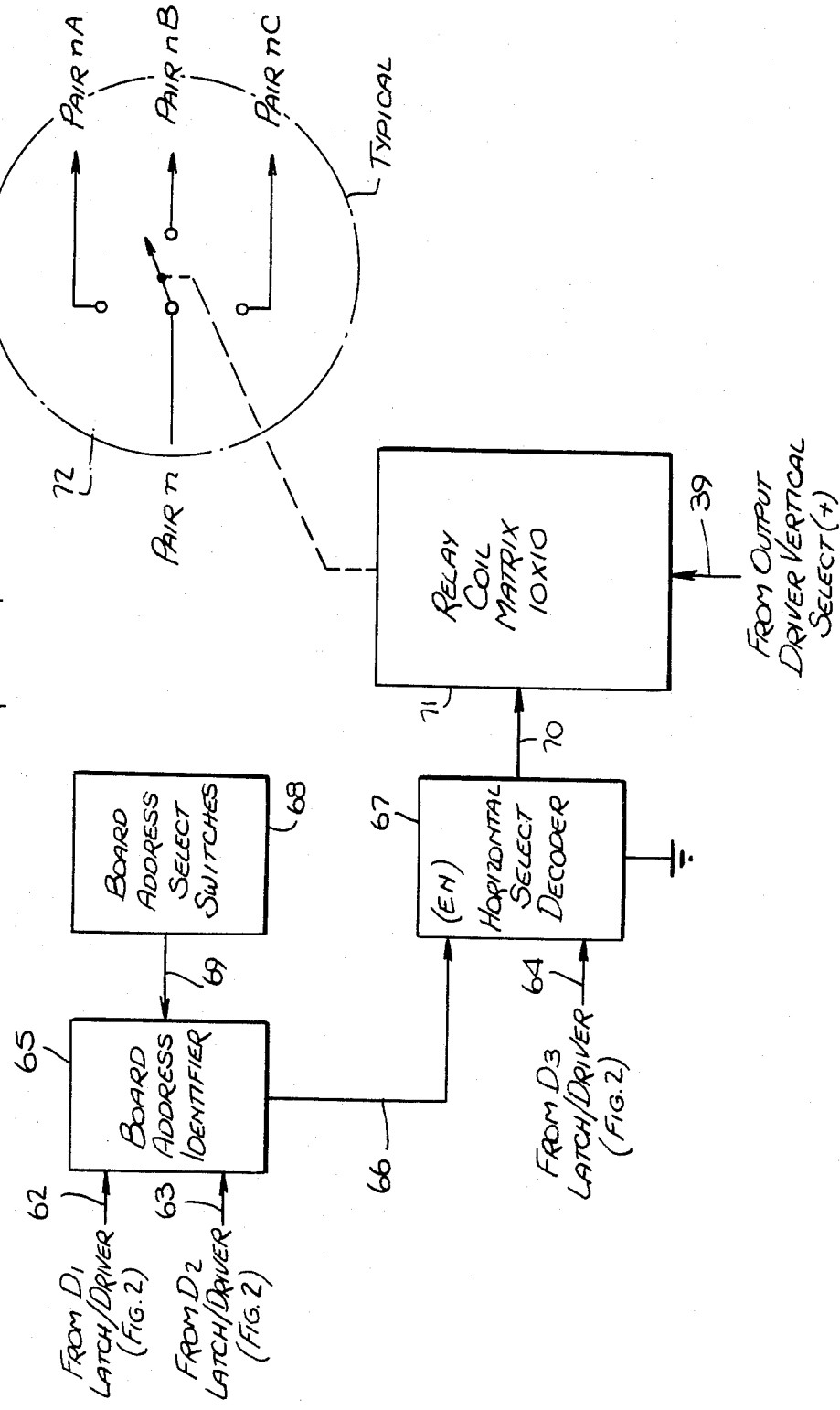
FIG. 3 is a block diagram of a typical matrix board of FIG. 1.

Before reviewing the operation of the system of FIG. 2, reference should be had to FIG. 3 for the remainder of the generalized circuit. As seen therein, the outputs over paths 62 and 63 from the latch/drivers 24 and 25 in FIG. 2 are fed to a board address identifier 65 having an output leading over a path 66 to an ENABLE input of a horizontal select decoder device 67. The data input to decoder 67 is obtained over path 64 from the latch/driver 43 in FIG. 2.

A group of board address select switches 68 are connected over a path 69 to the board address identifier 65. The output from horizontal select decoder 67 is furnished over path 70 to the relay coil matrix assembly 71 whose vertical select inputs are furnished over path 39 from the output driver 37 of FIG. 2.

As shown symbolically in FIG. 3, the relay coil matrix 71 contains 100 relay coils in a 10×10 matrix. However, each relay has two coils, one serving as a latch or set coil and the other serving as a reset coil. Therefore, there are only 50 relays associated with the coil matrix 71. Each relay, as will be explained in greater detail below, has a double-pole double-throw armature/contact assembly for switching one input pair of wires selectively to one or the other of two output pairs. By connecting two relays in tandem a tree switch assembly is obtained such that each input pair can be switched selectively between three separate output pairs. If all the relays associated with the matrix 71 are so paired, there will be 25 assemblies capable of switching 25 input pairs to any one of three corresponding output pairs, all of which is indicated symbolically within the phantom circle 72.

Referring collectively to FIGS. 1, 2 and 3, the subject system makes use of a five-digit address that can be keyed into the encoder 10 transmitting the corresponding tones over the cable pair 13. These tones are applied to decoder 22 which, upon detecting a first valid tone, applies a four-digit binary signal to path 23 and a strobe signal to paths 27 and 28. The signal over path 28 causes the decimal counter 29 to advance to its first count position transmitting a "set" signal to the box select memory 31. However, box select memory 31 will be set only if the binary signal over path 23 supplied to the decimal decoder 26 from decoder 22 corresponds to the setting of the address select switches 34. That is, assume, for example, that the address select switch assembly 34 is set to select the digit "6". If the binary equivalent of a "6" is applied over path 23 to the decoder 26 a decoded "6" will be applied to the switch assembly 34 and pass on over path 35 to box select memory 31 for setting the memory upon occurrence of an ENABLE or strobe signal from the "1" output of counter 29 over path 30. With the same setting of switches 34, the box select memory 31 will not be set if any other number than "6" is received by decoder 26.

Assuming, however, that box select memory 31 is set by the first decoded digit, the second digit will be stored in latch/driver 24 since upon its receipt and decoding by decoder 22, a strobe signal will advance counter 29 so that an output is fed over path 40 to the latch/driver 24 causing it to set to whatever binary input signal is applied thereto.

In similar manner, latch/driver 25 will store the third valid digit and latch/driver 43 will store the fourth valid digit. Upon receipt of the fifth digit it is applied over path 23 from decoder 22 to the decoder 26 and then over paths 36 and 38 to the output driver 37. At the same time, the counter 29 advances to apply an output signal over path 44 activating the relay activate pulse circuit 45. The circuit 45 has a built in delay permitting stabilization of the decoded signal whereupon it applies an enabling signal to the AND gate 33 having a second enabling signal applied from box select memory 31. This causes the output of the AND gate 33 to apply an enabling signal over path 58 to the output driver 37 causing its signals to be applied to the vertical select inputs of the matrix 71. Also, a signal from activate pulse circuit 45 is applied through OR gate 50 to the system reset pulse circuit 52. However, the latter has a built in delay such that a reset pulse is not produced until after the relay coils in matrix 71 have been appropriately energized.

The same ENABLE signal at the output of AND gate 33 is also applied to the latch/drivers 24, 25 and 43 to cause them to furnish outputs to the board address identifier 65 and horizontal select decoder 67 in FIG. 3. Assuming that the two-digit board address identifier stored in latch/drivers 24 and 25 matches that which is selected by the address select switches 68, an enabling signal will be applied over path 66 to the horizontal select decoder 67 completing an energization circuit for the selected relay coil in matrix 71.

Figure 4:
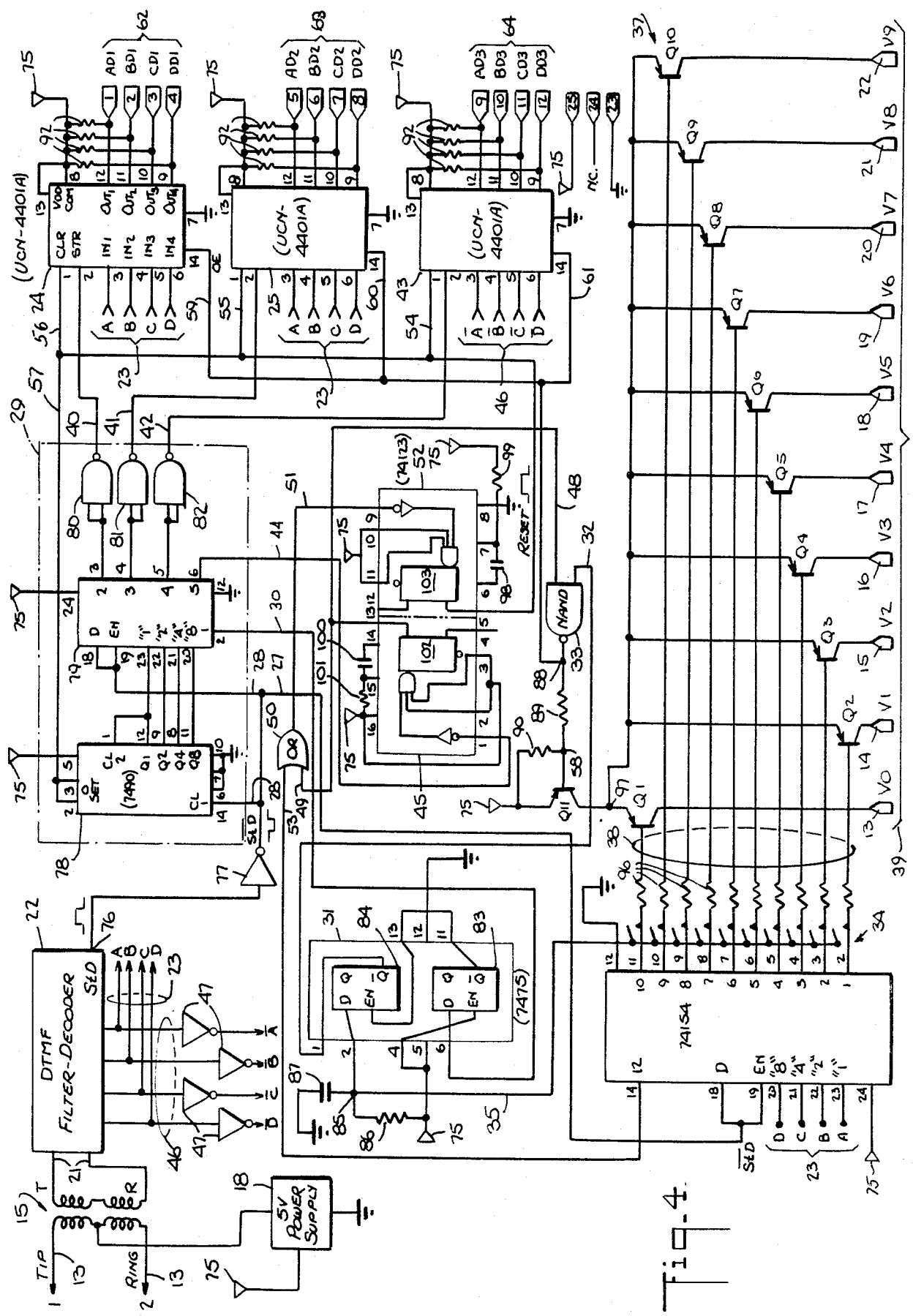
FIG. 4 is a detailed logic diagram of the circuit shown in FIG. 2.

Attention should now be directed to FIGS. 4, 5 and 6 which illustrate a specific implementation of the circuit just discussed with reference to FIGS. 1, 2 and 3. As seen in FIG. 4, the input tip and ring pair 13 is applied to the primary side of the transformer 15 whose center tap feeds the power supply 18 furnishing at an output terminal 75 a 5 Volt positive supply for the logic circuitry throughout the remainder of the system.

The secondary winding of the transformer 15 is coupled over a tip and ring circuit 21 to an input of the DTMF filter-decoder 22. At present it is preferred to use the combination of a MITEL Semiconductor type MT8865 filter feeding a type MT8860 decoder. This assembly provides a 4-Bit binary word corresponding to the tone pair decoded which is furnished to the normal outputs 23A, 23B, 23C and 23D and to the inverters 47 for producing the inverted outputs 46A, 46B, 46C and 46D. The decoder 22 also produces a delayed steering output at 76 labeled "StD". This output flags or indicates when a valid tone pair has been received. It provides a logic high when the output latch in the decoder has been updated. It remains high for a short interval after decay of the tone signal whereupon it returns to logic low.

The steering signal or flag at terminal 76 is passed through an inverter 77 to provide the negative going $\overline{StD}$ signal fed to the decimal counter 29 and to the BCD-to-decimal decoder 26. The decimal counter 29 is implemented by a type 7490 decade counter connected for operation as a BCD counter, weighted 1-2-4-8. The output of inverter 77 is fed to the clock input terminal of the counter 78. This decade counter is reset to zero by applying a positive going reset pulse to the "O-Set" inputs. The binary output from this counter is furnished to a type 74154 "1-of-16 data distributor" connected to function as a BCD-to-decimal converter. The nature of this device is that one selected output of 16 is caused to follow the input furnished to its data terminal, D, while all remaining fifteen outputs remain high. For the present system, only outputs 1 through 5 represented by pins 2, 3, 4, 5, and 6 are actually utilized. The data input represented by pin 18 is connected to receive the strobe signal from the output of inverter 77. Since the enable (EN) input at pin 19 is also connected to the output of inverter 77, the outputs of the data distributor 79 will be updated to correspond to the output from decade counter 78 during the interval that the strobe output from inverter 77 is low. At the end of the low strobe signal when it goes high the distributor 79 will hold its setting until the next strobe signal.

The outputs from pins 3, 4 and 5 of distributor 79 are each connected to a respective inverter 80, 81 and 82 whose outputs are connected, respectively, to paths 40, 41 and 42. Consequently, whenever one of the outputs of the distributor 79 coupled to pins 3, 4 or 5 is selected by the input to the distributor, such output goes low and the corresponding output of its interconnected inverter goes high. Thus, if the binary coded input at pins 20, 21, 22 and 23 of distributor 79 corresponds to a count of "2", the output at pin 3 will go low and the signal on path 40 will go high.

Two sections of a quad latch type 7475 are used to implement the box select memory device 31. As shown by the pin designations on the drawing, use is made of the first and third latch elements with the third element designated by the numeral 83 being connected to function as an inverter for the signal received at its D input over path 30 from pin 2 (count 1) of the distributor 79 in decimal counter 29. By utilizing the $\overline{Q}$ output of latch 83 the signal obtained at pin 11 of the quad latch component will go high when a "1" count is furnished to distributor 79 and the D-input of latch 83 goes low. This high output from latch 83 is fed back through pin 13 to the enable (EN) input of the latch 84 within the box select memory device 31. When the enable control is high the latch element follows the input at the D terminal. It will be observed that the D-input of latch 84 is connected via pin 2 of the module to a junction 85 between a resistor 86 and a capacitor 87. The capacitor 87 has its opposite terminal grounded while the resistor 86 has its opposite terminal connected to the positive voltage supply terminal 75. It will be observed that the junction 85 is connected over path 35 to a series of single-pole single-throw switches 34. When all of the switch elements of the switch assembly 34 are either open or connected to a high signal the voltage at junction 85 will be high. Therefore, the $\overline{Q}$ output of latch 84 will be low applying such low signal over path 32 to one of the inputs of NAND gate 33 such that its output at junction 88 remains high independent of the condition of the signal on the second input to the NAND gate 33 obtained over path 48. Since junction 88 is connected through a resistor 89 to the junction 58 and from there through a resistor 90 to the positive voltage supply, 75, the potential at junction 58 will also be high maintaining the PNP transistor 91 nonconductive. This mode of operation bars passage of a control signal from output driver 37 to the vertical select inputs 39 of the matrix 71. The manner in which this is accomplished will be explained below.

Each of the latch/driver elements 24, 25 and 43 is implemented by a type UCN-4401A semiconductor device manufactured by the Semiconductor Division of Sprague Electric Company. Referring to the latch/driver 24 which is typical, its clear (CLR) input represented by pin 1 is connected over path 56 to receive a reset signal in a manner to be described. The strobe (STR) input represented by pin 2 is connected to receive a signal over path 40 from the inverter 80. The four inputs represented by pins 3, 4, 5 and 6 are connected, respectively, to the outputs 23A, B, C and D from filter-decoder 22. Both the common (COM) terminal represented by pin 8 and the high voltage input ($V_{DD}$) represented by terminal 13 are connected to the power supply terminal 75. The output terminals represented by pins 9, 10, 11 and 12 are connected, respectively, to circuit board terminals AD1, BD1, CD1, DD1 of path 62 interconnecting with the correspondingly labeled terminals of the circuit board represented by FIG. 5. Each of the last mentioned terminals is also connected, respectively, by way of a resistor 92 to the positive voltage source terminal 75. The particular latch/driver device contains four latches feeding signals through a gate to its outputs. The gate is controlled by the output enable (OE) input of terminal 14, the arrangement being such that information present at an input is transferred to its latch when the strobe is high. A high clear input will set all latches to the output OFF condition regardless of the data or strobe input levels. A high OE will set all outputs to the OFF condition regardless of any other input conditions and without effecting any of the latches. When the OE is low, the outputs depend on the state of their respective latches. Referring to FIG. 4 it will be observed that the latch/drivers 24, 25 and 43 each derive a clear signal from the same source while they derive their strobe signals from respective paths 40, 41 and 42. Also, they derive their OE control from the common output of the NAND gate 33. As explained previously, unless the box select memory device 31 has its latch 84 actuated to apply a high to path 32, junction 88 at the output of NAND gate 33 will remain high which causes all of the outputs from the devices 24, 25 and 43 to remain OFF.

Figure 5:
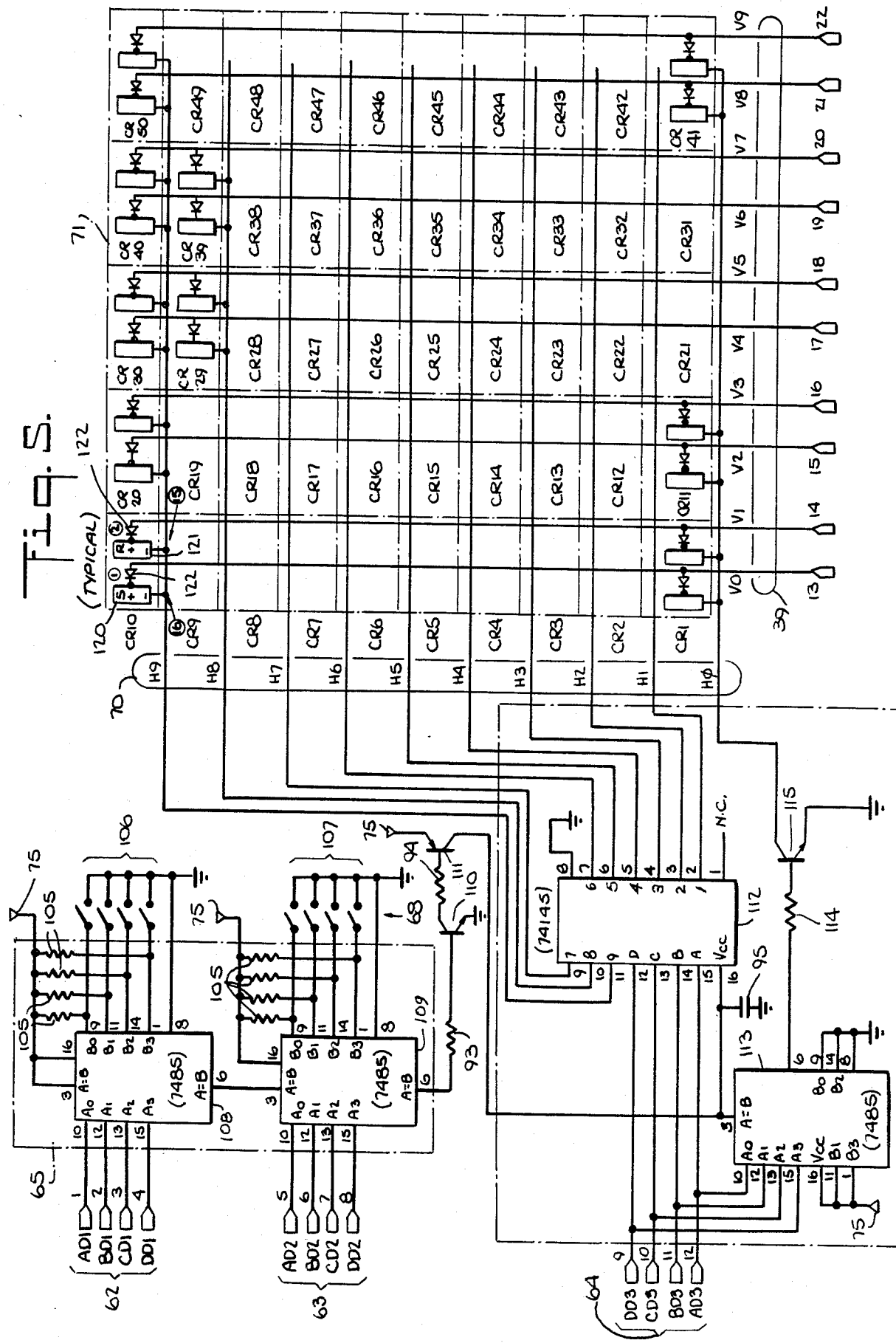
FIG. 5 is a detailed logic diagram of the circuit of FIG. 3.

The device 25 is connected substantially the same as device 24 except that its output terminals are connected to terminals AD2, BD2, CD2 and DD2 of path 63 for connection to the corresponding terminals in FIG. 5. Similarly, device 43 has its outputs connected, respectively, to terminals AD3, BD3, CD3 and DD3 of path 64 which connects with corresponding terminals in FIG. 5. In addition, device 43 has its inputs connected to the $\overline{A}$, $\overline{B}$, $\overline{C}$ and $\overline{D}$ outputs of the inverters 47 such that device 43 obtains an inverted output from filter-decoder 22.

The BCD-to-decimal decoder 26 is implemented by another type 74154 "1-of-16 data distributor" device of which the 1 through 10 and 12 outputs are utilized along with the four inputs, the latter being connected to the output 23 from filter-decoder 22. The data and enable inputs are joined together and connected to receive the $\overline{StD}$ signal from the output of inverter 77 in the same manner as the device 79 in counter 29. As shown, the outputs 1 through 10, corresponding to pins 2 through 11, are connected, respectively, through individual resistors 96 to the corresponding base electrode of a respective PNP transistor Q1 through Q10. The collector electrode of transistor Q1 is connected to an output terminal 13 of the circuit board forming a part of the output connection 39 to the correspondingly numbered terminal in FIG. 5. In similar manner each of the other transistors has its respective collector electrode connected to a corresponding terminal 14 through 22, all as shown. The emitter electrodes of all of the transistors Q1 through Q10 are connected together to a junction 97 tied to the collector electrode of transistor 91. Therefore, it will be understood that so long as transistor 91 is held nonconductive, all of the transistors Q1 through Q10 will also be nonconductive. However, as soon as transistor 91 is conductive the particular transistor Q1 through Q10 that has a low signal on its base electrode will also be conductive. As will be explained, only one of the transistors Q1 through Q10 can have a low signal on its base electrode at any given time and so only a selected one will be conductive when transistor 91 conducts. In essence, upon conduction of transistor 91 and a selected transistor Q1 through Q10 the positive voltage from terminal 75 will be fed to the selected output terminal 13 through 22 of the path 39.

It will be observed that the switch assembly 34 has ten manually switchable sections. Each section has a fixed contact joined to a corresponding one of the ten outputs from the device 26. If, for example, the third element from the bottom as seen in the drawing of switch 34 is closed it establishes the address of the associated matrix 71 as corresponding to the digit "3". Therefore, only if input pins 22 and 23 are furnished with a high from connections 23A and 23B when the D and EN inputs receive a low signal from the $\overline{StD}$ input will output terminal 3 corresponding to pin 4 go low causing the voltage at junction 85 associated with the box select memory device 31 to go low and set latch 84 such that its $\overline{Q}$ output goes high. It will be understood that such condition serves as an enabling signal for the NAND gate 33 to respond to a high on path 48.

Reverting to device 26, it should be observed that its output 12 corresponding to pin 14 is connected to path 53 leading to one input of the OR gate 50. As is well-known, the # key of a DTMF encoder provides a tone signal that is decoded by the DTMF filter-decoder 22 as a binary coded decimal number "12". Hence, a low signal at pin 14 of the distributor 26 is the response to actuation of the "#" key on the encoder.

A type 74123 dual one-shot device is used to implement the relay activate pulse generator 45 and the system reset pulse generator 52. The connections are as shown in the drawing with pin 1 being connected to path 44, pins 2 and 3 being joined together and connected to the positive voltage terminal 75, pin 5 being connected to paths 54, 55, 56 and 57, pin 6 being connected through a capacitor 98 to pin 7 and from there through a resistor 99 to the positive terminal 75. Pin 8 is connected to ground and pin 9 is connected to path 51. Pins 10 and 11 are joined together and to the positive terminal 75 while pin 14 is connected through a capacitor 100 to pin 15 and from there through a resistor 101 to the positive terminal 75. Finally, pin 13 is connected to one input of OR gate 50 over path 49 and to the second input of NAND gate 33 over path 48. Whenever the signal on path 44 from distributor device 79 goes low the one-shot section 102 is activated to provide a delayed output pulse at pin 13 into OR gate 50. This output pulse is high and applies in known manner a high signal through OR gate 50 to the input pin 9 feeding one-shot 103. The high signal at pin 9 has no affect on one-shot 103. However, when one-shot 102 returns to a low output at pin 13 the signal fed to one shot 103 will trigger it into its active state for a predetermined interval producing a positive going reset signal on paths 54, 55, 56 and 57.

The previously mentioned high signal from one-shot 102 is also applied over path 48 to NAND gate 33 causing the output at junction 88 to go low if latch 84 in memory device 31 was previously set to apply a high to path 32. A low at junction 88 will cause junction 58 to go low and render transistor 91 conductive. It will also, as previously explained, enable the outputs from the devices 24, 25 and 43 to follow their inputs.

Referring now to FIG. 5, it will be seen that the board address identifier 65 is implemented by two type 7485 4-bit magnitude comparators. These devices are connected to compare two 4-bit words and provide an output indicating whether or not they are equal. The input word is applied through pins 10, 12, 13 and 15 and compared with the preselected address word applied to pins 9, 11, 14 and 1 causing a high to appear at output pin 6 if the two words are equal. Selection of the preset word is established by switch assembly 68 having grounded fixed contacts and respective moveable contacts connected to the terminals 9, 11, 14 and 1. Each of said terminals is also connected through an individual resistor 105 to the positive terminal 75. Setting the upper set of switches, 106, will preselect one digit while setting the lower set of switches, 107, will select a second digit for a two-digit address. The two comparators 108 and 109 are connected in cascade, as shown, such that the A=B output of comparator 109 will provide a high only if equal words are detected by both comparators 108 and 109. A high signal at the output of comparator 109 will cause transistors 110 and 111 to become conductive so as to apply a positive voltage from terminal 75 to the voltage input terminal at pin 16 of a type 75145 BCD/Decimal Decoders/Drivers device 112 constituting a part of the horizontal select decoder 67. This application of positive voltage over path 66 to pin 16 of the device 112 functions as an enabling signal permitting it to decode a binary signal obtained over path 64 from the corresponding terminals in FIG. 4. The same voltage is also applied as an enabling signal to the A=B input at pin 3 of another type 7485 4-bit magnitude comparator 113 coupled to provide an output at its pin 6 of a high whenever a binary coded decimal number "10" is received from the DTMF encoder as a consequence of actuation of the "0" key. Thus, the B1 and B3 data inputs for device 113 are joined together and connect to the positive voltage terminal 75 while the B0 and B2 data inputs are joined together and connected to ground. The A0 through A3 inputs are connected, as shown, to terminals AD3, BD3, CD3 and DD3. Output pin 6 is connected through a resistor 114 to the base electrode of a transistor 115 for causing transistor 115 to conduct whenever the signal at output pin 6 of device 113 goes high. With the emitter electrode of transistor 115 connected to ground, conductivity of transistor 115 completes a circuit from its collector electrode to ground for a reason to be explained below.

The remaining portion of FIG. 5 consists of the matrix 71 of 50 identical relays of the latching type, each having a latching or set coil 120 and a release or reset coil 121. For the purpose of distinguishing the relays, they have each been assigned a number from 1 to 50 preceded by the letters CR. For simplicity there has only been shown in detail a sufficient number of the relays to indicate the interconnecting scheme, it being understood that the relays are all identical. The contacts and armatures controlled by the coils are not shown in FIG. 5 but will be explained below with reference to FIG. 6. For the present, still referring to FIG. 5, it will be seen that each of the coils has one terminal connected through a diode to a vertical conductor terminating in one of the terminals 13 to 22, inclusive, while each of the coils has its opposite terminal connected to a horizontal conductor identified by the numbers H∅, H1, H2, H3, H4, H5, H6, H7, H8 and H9. The conductor H∅ is connected to the collector electrode of transistor 115. The remaining horizontal conductors are connected in order to the 1 through 9 outputs represented by pins 2, 3, 4, 5, 6, 7, 9, 10 and 11 of the decoder/driver device 112. Referring to the relay CR10 it should be noted that the latching coil 120 is connected to the horizontal line H9 and to the vertical line leading to terminal 13 which connects in FIG. 4 to the V∅ terminal and its connection to the collector of transistor Q1. It must be borne in mind that while on the DTMF encoder, 10, the key is identified by the single digit "∅", the decoder 22 provides the binary equivalent of the decimal number "10". Therefore, the number "10" output from device 26 in FIG. 4 is used to control the conductivity of transistor Q1 and the conductivity of the vertical line V∅ in FIG. 5. If at the time that transistor Q1 and transistor 91 in FIG. 4 is rendered conductive there is also an ON output at pin 11 of device 112 in FIG. 5 corresponding to the digit "9", a circuit will be completed from the positive supply through transistor 91, transistor Q1, terminals 13 and the diode 122 to the coil 120 and back through horizontal conductor H9 and output "9" of device 112 to ground.

If, instead of the number 90, the address were 91, the circuit would be completed via vertical line V1 and terminals 14 through resetting coil 121 of the relay CR10 for the purpose of releasing said relay. In similar manner, any of the other latching and resetting coils can be individually addressed by a two-digit number ranging from 00 which addresses the latching coil of relay CR1 to 99 which addresses the resetting coil of relay CR50.

In order to illustrate the flexibility of the subject system, it is assumed that the matrix 71 is arranged to serve 25 input pairs and provide for each pair a selection between three output pairs. For this purpose it is necessary to use two of the relays in the matrix in cascade and these can be wired as shown in FIG. 6 by reference to the interconnection between relays CR9 and CR10, as an example. The circuit being described employs a type DS2E-ML2-DC5V two coil latching relay by Aromat. This relay has a double-pole double-throw output. It is packaged for direct installation in standard printed circuit boards and its pin terminals are identified by the numerals within circles on the illustration in FIG. 6. As illustrated, pin 1 of relay CR10 is connected to the cathode of diode rectifier 122 whose anode is connected to the V∅ line associated with circuit board terminal 13. Pin 2 of relay CR10 is connected to the cathode of another diode rectifier 122 whose anode is connected to the V1 line associated with circuit board terminal 14. All of the other terminals of relays CR9 and CR10 are connected as clearly shown by conventional symbols in FIG. 6. Thus, an incoming pair such as the tip and ring wires 125 and 126 from trunk cable 14 are connected, respectively, to input pins 4 and 13 of relay CR9. The tip line 125 can be routed to any one of three output terminals labeled T1A, T1B and T1C. As illustrated in FIG. 6 both relays CR9 and CR10 are in the "reset" position such that the tip line 125 is connected to output terminal T1A at pin 6 of relay CR10. Similarly, the ring line 126 is connected to output terminal R1A which is one of a set of three including terminals R1B and R1C. If it is desired to connect the line represented by wires 125 and 126 to terminals T1B and R1B, respectively, it is only necessary to energize the latching coil 120 of relay CR10 to transfer its armature control contacts. On the other hand, if it is desired to switch the incoming line represented by wires 125 and 126 to output terminals T1C and R1C it is only necessary to energize the latching coil in relay CR9. Since these are latching relays the individual coils need only be energized momentarily and the relay will hold its set or reset position until the opposite coil is energized.

For convenience in wiring the matrix, adjacent odd and even numbered relays are wired as shown in FIG. 6. However, any combination of the relays may be utilized as desired.

Recapitulating, it should be apparent that there is provided a system for remotely selecting and switching a signal circuit (any one of the pairs contained in feeder cable 14) selectably between a plurality of predetermined local circuits, that is, for example, the three output circuits shown in FIG. 6. The system comprises in combination a switching matrix 71 having a plurality of selectable switching means each with one terminal coupled to a different signal circuit and with a plurality of additional terminals coupled, respectively, to a different one of the predetermined local circuits. For controlling the matrix there is provided a decoder 22 with means coupled between the decoder and one axis of the matrix for storing information corresponding to one digit of a plural digit encoded signal upon receipt of said one digit in a predetermined digit sequence. The foregoing refers to the storage in latch/ driver device 43 of the fourth digit transmitted in a five-digit address. There is also provided means for applying a control to another axis of the matrix 71 upon receipt of the signal corresponding to a subsequent digit, namely the fifth digit of said plural digit encoded signal. The last mentioned means including means for simultaneously using the stored information, namely the fourth digit, to apply a corresponding control to the first mentioned axis. Each of the relays of the matrix have separate latching and unlatching inputs and each of said inputs is coupled between different points of the respective axis of the matrix 71 such that application of controls to one combination of points selected one from each of said axis will latch the corresponding relay device while application of the controls to another combination of points selected one from each of said axis will unlatch said corresponding relay device.

It should be understood that the circuit shown in FIG. 5 represents one of the boards 19 shown in FIG. 1 and that the subject circuit will be duplicated for each of the additional boards served by the common receiver-matrix control circuit 16. For this purpose, the 25 flag shaped output terminals shown in FIG. 4 would be connected in parallel to the correspondingly numbered terminals of each board 19 represented by the circuit of FIG. 5. Thus, there would be a plurality of switching matrices 71 coupled to the single decoder 22 with individual means associated with each of said matrices responsive to a control corresponding to at least one other digit, namely the board address identifier digit, of said plural digit encoded signal for enabling a selected one of the plurality of matrices corresponding to such one other digit to respond to the axes controls, all other matrices being held unresponsive thereto. This follows from the fact that only the matrix whose transistors 110 and 111 (see FIG. 5) are rendered conductive can respond to the horizontal and vertical control signals. In the described system, the second and third digits stored in the latch/driver devices 24 and 25 carry the board address that is identified by the board address identifier 65.

Supplementing the foregoing discussion it is believed useful to observe the convention that has been followed in preparing the logic diagram drawings. With regard to all of the logic component symbols any small numbers appearing immediately outside the outline of the logic device alongside a connection identify the numbered pin terminals associated with that particular device. The type number is shown within parethesis while the identification or name of the particular terminal is represented by any letters or numbers appearing within the outline of the symbol. Typical component description not previously mentioned is set forth in the following tabulation.

| Ref. No. | Description |
| --- | --- |
| 86 | Resistor 10K, ¼ 5% |
| 87 | Capacitor 0.1 μf |
| 89 | Resistor 1K, ¼ W 5% |
| 90 | Resistor 10K, ¼ W 5% |
| 91 | 2N3906 PNP Transistor |
| 92 | Resistors 1K, ¼ W 5% |
| 93 | Resistor 2.2K, ¼ W |
| 94 | Resistor 390Ω, ¼ W |
| 95 | Capacitor 0.1 μf 50 V. |
| 96 | Resistors 1K, ¼ W 5% |
| 98 | Capacitor 0.1 μf 50 V. |
| 99 | Resistor 1 M, ¼ W 5% |
| 100 | Capacitor 0.1 μf 50 V. |
| 101 | Resistor 1 M, ¼ W 5% |
| 105 | Resistors 10K, ¼ W |
| 110 | 2N2222 NPN Transistor |
| 111 | 2N3906 PNP Transistor |
| 114 | Resistor 2.2K, ¼ W |
| 115 | 2N5305 NPN Transistor |
| 122 | 1N4001 General Purpose Rectifier |
| Q1–Q10 | 2N3906 PNP Transistors |

It should be apparent that the invention has been described with reference to one specific embodiment thereof. Considerable variation in its usage and interconnection should be readily apparent to those skilled in the art. The use of latching relays conserves power since power is required only if it is desired to change a matrix connection.

The output terminals of the matrix may be utilized by wiring all three to outgoing pairs or only two can be used for outgoing pairs while the third can be used for connection to a test circuit. That is, a resistance module can be provided in the crossconnection box or pedestal connected to one of the three output terminals of each relay set in the matrix such that if that particular output terminal is selected a given resistance, for example 1200 ohms, would be connected across the wire pair as a test termination to enable the central office to test for circuit continuity and conductivity. Another possibility is to use the third output terminal for connection to an input of another board in order to provide the capability of obtaining "multiples".

Finally, it should be apparent that the subject invention is not limited to telephony but can be used for other remote circuit switching installations.

Having described the subject invention with reference to the presently preferred embodiment thereof, it should be understood that various changes may be made therein without departing from the true spirit of the invention as defined in the appended claims.

What is claimed is:

1. A remotely controlled crossconnection system for remotely selecting and switching the connections of the individual signal circuit pairs of a plural pair feeder cable each to a selected pair of a corresponding group of local circuit pairs, each group of local circuit pairs having only one pair in use at a time and connected through said crossconnection system to said feeder cable, said system comprising in combination, for installation in a crossconnection box at the field termination of a feeder cable, a switching matrix having a plurality of selectable switching means each with a feeder cable pair connection point and means for selectably connecting said connection point to a plurality of selectable local pair connection points arranged for connection to the pairs of a corresponding one of said groups of local circuit pairs, a decoder device, means coupled between said decoder device and one axis of said matrix for storing information corresponding to one digit of a plural digit encoded signal upon receipt of said one digit in a predetermined digit sequence, means for applying a control to another axis of said matrix upon receipt of a signal corresponding to a subsequent digit of said plural digit encoded signal, said last mentioned means including means for simultaneously using said stored information to apply a corresponding control to said one axis, the application of said controls to said axes serving to select and operate one of said switching means, means for coupling an input of said decoder device to a spare one of said feeder cable signal circuit pairs, and a power supply for supplying operating power to said decoder device and said matrix control means, said power supply having a power input terminal, and means for connecting said power input terminal to said spare one of said feeder cable signal circuit pairs in a phantom circuit for receiving energizing power over said feeder cable.

2. A remotely controlled crossconnection system according to claim 1, characterized in that each of said switching means comprises a latching relay device having separate latching and unlatching inputs, and each of said inputs is coupled between different input points of said respective axes such that application of said controls to one combination of points selected one from each of said axes will latch the corresponding relay device while application of said controls to another combination of points selected one from each of said axes will unlatch said corresponding relay device.

3. A remotely controlled crossconnection system according to claim 2, characterized in that said latching relay device comprises a latching coil and an unlatching coil, said latching coil is connected between a point of said one axis and a point of said another axis, and said unlatching coil is connected between a different point of each of said axes.

4. A remotely controlled crossconnection system according to claim 1, characterized in that there are a plurality of said switching matrices coupled to said decoder device, and individual means associated with each of said matrices responsive to a control corresponding to at least one other digit of said plural digit encoded signal for enabling a selected one of said plurality of matrices corresponding to said one other digit to respond to said axes controls, all other matrices being held unresponsive thereto.

5. A remotely controlled crossconnection system according to claim 4, characterized in that each of said switching means comprises a latching relay device having separate latching and unlatching inputs, and each of said inputs is coupled between different input points of said respective axes such that application of said controls to one combination of points selected one from each of said axes will latch the corresponding relay device while application of said controls to another combination of points selected one from each of said axes will unlatch said corresponding relay device.

6. A remotely controlled crossconnection system according to claim 5, characterized in that said latching relay device comprises a latching coil and an unlatching coil, said latching coil is connected between a point of said one axis and a point of said another axis, and said unlatching coil is connected between a different point of each of said axes.

7. A remotely controlled crossconnection system according to claim 4, characterized in that said individual means that is associated with each of said matrices for selective enabling of its corresponding matrix comprises a BCD 2-digit address identifier and means coupled to said identifier for preselecting said two digits.

8. A remotely controlled crossconnection system according to claim 1, characterized in that there are a plurality of said decoders each associated with at least one corresponding switching matrix and having an input coupled to said spare feeder cable pair, and individual selection means associated with each of said decoders responsive to a control corresponding to at least one other digit of said plural digit encoded signal for enabling a selected one of said plurality of decoders corresponding to said other digit to activate an associated matrix in accordance with said axes controls.

9. A remotely controlled crossconnection system according to claim 8, characterized in that there are a plurality of said switching matrices coupled to each of said decoders, and individual means associated with each of said matrices responsive to a control corresponding to at least one other digit of said plural digit encoded signal for enabling a selected one of the plurality of matrices that are associated with an enabled decoder to respond to said axes controls, all other matrices being held unresponsive thereto.

10. A remotely controlled crossconnection system according to claim 9, characterized in that each of said switching means comprises a latching relay device having separate latching and unlatching inputs, and each of said inputs is coupled between different input points of said respective axes such that application of said controls to one combination of points selected one from each of said axes will latch the corresponding relay device while the application of said controls to another combination of points selected one from each of said axes will unlatch said corresponding relay device.

11. A remotely controlled crossconnection system according to claim 10, characterized in that said latching relay device comprises a latching coil and an unlatching coil, said latching coil is connected between a point of said one axis and a point of said another axis, and said unlatching coil is connected between a different point of each of said axes.

12. A remotely controlled crossconnection system according to claim 1, characterized in that said decoder device is a dual tone multifrequency decoder, and said encoded signal is a tone signal.

13. A remotely controlled crossconnection system according to claim 4, characterized in that said decoder device is a dual tone multifrequency decoder, and said encoded signal is a tone signal.

14. A remotely controlled crossconnection system according to claim 8, characterized in that said decoder device is a dual tone multifrequency decoder, and said encoded signal is a tone signal.

15. A remotely controlled crossconnection system according to claim 9, characterized in that said decoder device is a dual tone multifrequency decoder, and said encoded signal is a tone signal.

* * * * *